United States Patent

Chapman

[15] 3,681,765

[45] Aug. 1, 1972

[54] FERROELECTRIC/PHOTOCONDUCTOR MEMORY ELEMENT

[72] Inventor: Daniel W. Chapman, San Jose, Calif.

[73] Assignee: International Business Machines Corporation, Armonk, N.Y.

[22] Filed: March 1, 1971

[21] Appl. No.: 119,973

[52] U.S. Cl. .........340/173.2, 250/211 R, 250/219 D, 340/173 LM

[51] Int. Cl. .......G11c 7/00, G11c 11/22, G11c 11/42

[58] Field of Search...250/211 R, 219 D; 340/173 LM, 340/173.2

[56] References Cited

UNITED STATES PATENTS

| | | | |
|---|---|---|---|
| 3,508,213 | 4/1970 | Hastings | 340/173.2 |
| 3,229,261 | 1/1966 | Fatuzzo | 340/173.2 X |
| 2,905,830 | 9/1959 | Kazan | 340/173.2 X |

*Primary Examiner*—Bernard Konick
*Assistant Examiner*—Stuart Hecker
*Attorney*—Hanifin & Jancin and Melvyn D. Silver

[57] ABSTRACT

A memory element for use in photoelectric data recording apparatus of the type described in U.S. Pat. No. 3,148,354, comprising a sandwich-like structure of a top conductive electrode in electrical contact with a photoconductive material in electrical contact with a discontinuous interface layer in electrical contact with a ferroelectric material, in electrical contact with a conductive electrode substrate. The top conductive electrode and discontinuous interface layer are chosen to be blocking contact with the photoconductor in the dark, and injecting in the light. Further, one of the electrodes comprises a plurality of individual electrodes of stripe configuration while the other electrode comprises a bus bar portion and at least one reference or "ground" portion. The bus bar portion is in light controlled electrical contact with at least one localized part of the stripe configured electrodes via the photoconductor material. Where the top electrode comprises the bus bar and reference or ground portion and the discontinuous interface layer is a series of electrically conductive islands and the bottom electrode is in a striped electrode configuration, then by proper arrangement of islands and stripes, a focusing effect is achieved to allow switching of the ferroelectric material with a lower current density in the photoconductor.

17 Claims, 10 Drawing Figures

INVENTOR
DANIEL W. CHAPMAN

BY *Melvyn David Silver*
ATTORNEY

FERROELECTRIC/PHOTOCONDUCTOR MEMORY ELEMENT

FIELD OF THE INVENTION

Storage apparatus and elements in general, and photoelectric data recording apparatus and elements in particular, where such elements are characterized by the combination of photoconductive and ferroelectric materials in a layered structure.

RELATION TO OTHER APPLICATIONS

This application relates to U.S. Pat. No. 3,148,354, issued Sept. 8, 1964, entitled "Photoelectric Recording Apparatus" by R. M. Schaffert, assigned to the assignee of this invention; and to application Ser. No. 119,977, entitled "Ferroelectric/Photoconductor Storage Device With An Interface Layer," by Daniel W. Chapman and Rajendra R. Mehta, filed on Mar. 1, 1971, and assigned to the assignee of this invention, the teachings of which are incorporated into this application.

BACKGROUND OF THIS INVENTION

Photoelectric recording apparatus are known in the art. One particular form of such apparatus is described in the above-mentioned Schaffert patent. The memory element of the Schaffert patent essentially comprises a transparent conductive layer, electrically connected to a photoconductive layer, which is in turn electrically connected to a ferroelectric layer, which in turn is electrically connected to a conductive substrate electrode. The theory of operation of this device is fully explained in the above-mentioned patent. Further, an improvement upon the memory element of Schaffert is described in the aforementioned copending application of Mehta. This application in turn expands upon the work of Mehta, to show an improved configuration for that memory element.

Thus, considering the improvements of Mehta in relation to Schaffert above, an object of this invention is to reduce background noise in a photoelectric memory element.

Another object is to provide a focusing effect whereby the ferroelectric material can be switched with lower photo current densities than previously taught in the art.

Still another object is to provide a memory element capable of storing information for many switching cycles without loss of information due to disturbing pulses.

Still another object of this invention is to provide a memory element permitting low photo current density and ease of addressing simultaneously.

SUMMARY OF THE INVENTION

These and other objects are met by the configuration of the memory element of this invention. Briefly stated in one embodiment, the memory element for use in photoelectric data recording apparatus comprises a sandwich or layered-type structure that comprises a top conductive electrode in electrical contact with a photoconductive material in electrical contact with a discontinuous interface layer in electrical contact with a ferroelectric material in electrical contact with a conductive substrate electrode. The top conductive electrode and discontinuous layer form blocking contacts with the photoconductor in the dark, and are injecting in the light. In one embodiment, the conductive substrate electrode comprises a plurality of individual electrodes of a striped configuration, while the top conductive electrode is transparent and comprises a bus bar portion and at least one reference or ground portion, where the bus bar portion is in light controlled electrical contact with at least one localized part of the stripe configured electrodes via the photoconductor material. If the discontinuous interface layer is in an island configuration and the islands are chosen to be smaller in size than the size of the light beam addressing the memory element, and are further chosen to be aligned along individual conductive substrate stripes, then a focusing effect occurs requiring minimal photocurrent density to switch the ferroelectric, for recording or reading.

The above and other embodiments of this invention, including the method of addressing this memory element, will best be understood in relation to the following general description when read in conjunction with the following drawings.

IN THE DRAWINGS

Figure 5:
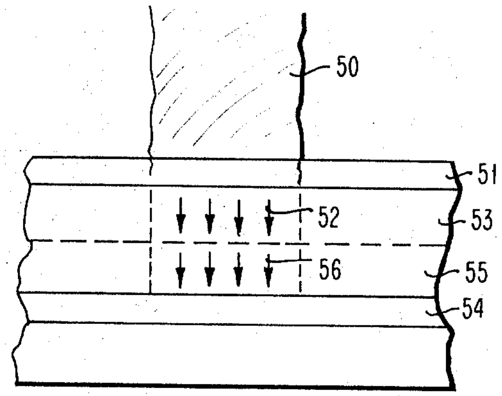
Figure 6:
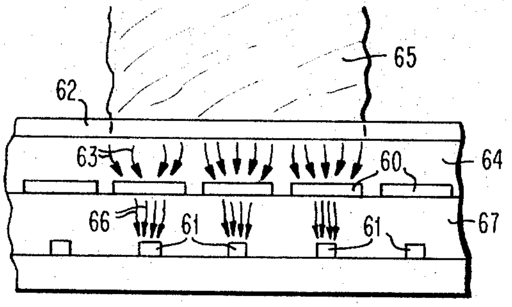
Figure 7:
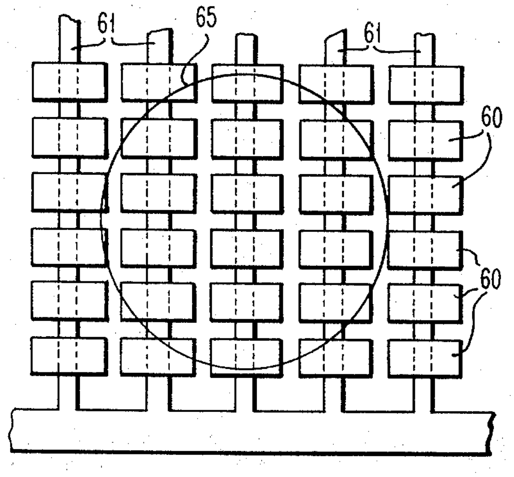

FIGS. 5, 6, and 7 show, in order, the general effect of the device of Mehta as to switching of the ferroelectric (FIG. 5), a cross-section schematic of the focusing effect of this invention (FIG. 6), and the device of FIG. 6 in a top view, FIG. 7.

Figure 3:
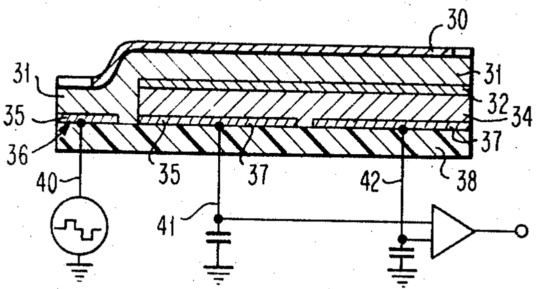
FIG. 3 shows a cross-section of one embodiment of this invention, which is further shown in greater detail in a top view in FIG. 4.
Figure 4:
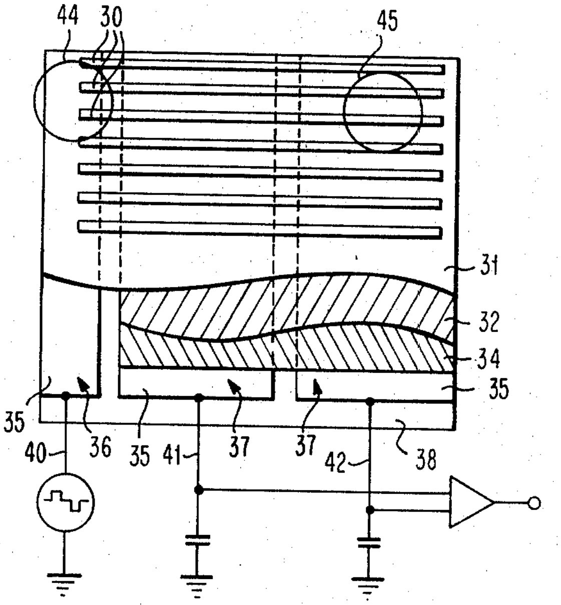
Figure 8A:
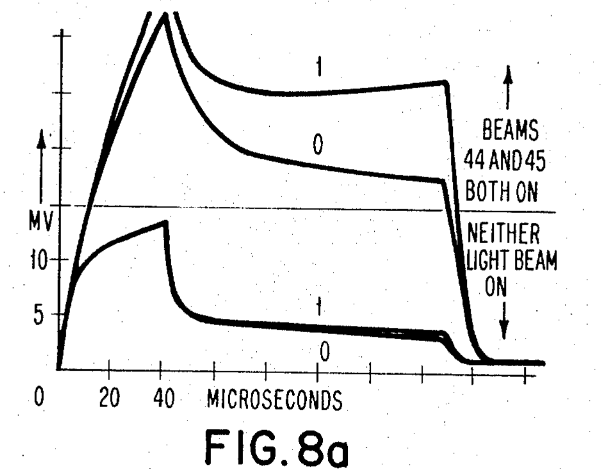

FIGS. 8*a*, *b*, and *c* show oscilloscope traces of switching characteristics of a device of FIGS. 3–4.

GENERAL DESCRIPTION

This invention is best understood by first understanding U.S. Pat. No. 3,148,354, of Schaffert, "Photoelectric Recording Apparatus" and assigned to the assignee of this invention. This patent is incorporated into this specification in its entirety for its teachings.

The memory element of Schaffert has been modified with an improved memory element of Mehta, application Ser. No. 119,977, entitled Ferroelectric/Photoconductor Storage Device With An Interface Layer, filed Mar. 1, 1971, and copending with this application and assigned to the assignee of this invention. The application of Mehta is also incorporated into this specification for clarity and for brevity.

Very briefly stated, in a layered structure comprising a photoconductive material upon a ferroelectric material, with the photoconductor in electrical contact with the ferroelectric (either directly or via the discontinuous interface of Mehta), means are utilized to contact the photoconductor and ferroelectric materials.

Typically, the electrical contact means comprise a top conductive electrode, located upon the photoconductor, and a conductive substrate electrode located beneath the ferroelectric. The relationship is such as to form a sandwich-like structure comprising the top electrode, photoconductor, ferroelectric, and conductive electrode substrate. The invention of Mehta utilizes a discontinuous interface layer contact between the photoconductor and ferroelectric material.

Figure 1:
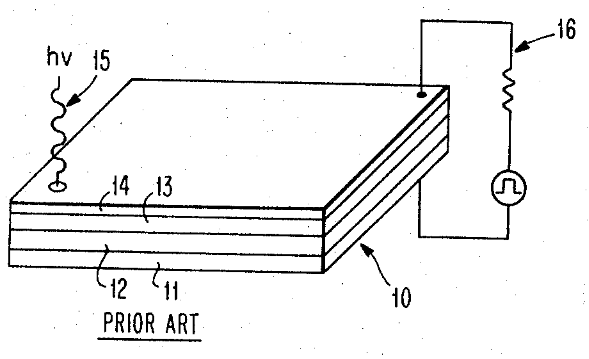
FIG. 1 shows a prior art device of Shaffert.

The prior art memory element of Schaffert is shown in FIG. 1. Memory element 10 has a top transparent electrode layer 14, in electrical contact with a photoconductive layer 13, in electrical contact with a ferroelectric layer 12, in electrical contact with a conductive substrate electrode 11. In operation, a light beam 15 impinges upon a portion of the element 10 to be addressed, while electrical contact means 16 is connected to the top transparent electrode 14 and conductive substrate electrode 11 to form the circuit to allow switching as further described in Schaffert and in Mehta.

Figure 2:
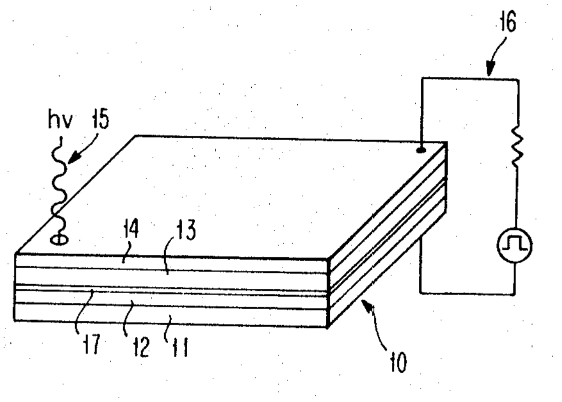
FIG. 2 shows the improved device of Mehta.

The improved device of Mehta is shown in FIG. 2. In this device, the numbers represent the same elements as in FIG. 1, and perform the same functions, except that an additional layer 17 is present. This is a discontinuous interface layer, as described in Mehta, located between and in electrical contact with the photoconductor material 13 and ferroelectric material 12. The function of the discontinuous interface layer 17 is the subject of the Mehta invention, and is fully described therein.

This invention is concerned with a configuration of the Mehta memory element, for the purpose of reducing noise generated by partial switching in the unaddressed areas of such a device. Partial switching occurs in the unaddressed area because ferroelectrics do not have a true coercive force and therefore the small disturb voltage which appears across the large unilluminated (unaddressed) area of the prior art device causes an undesirable amount of partial switching per unit area to occur throughout the unaddressed area. An improved device to minimize this effect and thus reduce noise and disturb effects is shown in FIGS. 3 and 4. FIG. 4 is a top view rendition of the device of FIG. 3.

In FIG. 3 is shown top conductive electrodes as stripe electrodes 30, photoconductive material 31, discontinuous conductive interface layer 32, ferroelectric material 34, and conductive substrate electrode 35, which can be considered as being of two or more separate portions, a bus bar portion 36, and reference or ground portions 37. This sandwich-like layered structure may be made as successively built up and deposited layers upon an insulating substrate 38. The method of manufacturing such a device is discussed in Mehta and in Schaffert, and in an example described later below.

FIG. 4 is a top view rendition of FIG. 3. The figures show electrical drive connection 40 connected to bus bar portion 36, and electrical readout contacts 41 and 42 are connected to the reference or ground portions 37 of conductive substrate electrode 35. In these views, the conductive substrate electrode is in the form of the bus bar portion and reference or ground electrode portions, though it will be clear from later discussion that the top and bottom electrode design may be interchanged. The top electrode 30 is shown as a series or a plurality of conductive stripes making blocking contact with the photoconductor in the dark and injecting contact in light. As discussed later however, the top electrode may be of bus bar and reference portion configuration while the conductive substrate electrode is of the striped configuration.

Referring to FIG. 3, it is evident that the bus bar 36 is separated from the strip electrodes 30 via the photoconductor 31. In this type of configuration, a light beam 44 (FIG. 4) may be used as an addressing beam in conjunction with light beam 45. When light beam 44 is incident on the top conductive electrode 30 and the photoconductor 31, voltage applied from pulse generator 40 will be transmitted to a small number of the electrode stripes 30 via the photoconductor 31 which conducts in the presence of light from beam 44. This voltage in turn is transmitted through the stripes so selected by beam 44 all across the element where those stripe electrodes are present. Where light beam 45 is also present, current flows from the stripes selected by beam 44 through the photoconductor 31 in the area of light beam 45, to the discontinuous interface layer 32, charging the ferroelectric in the area of light beam 45 to sufficient potential with respect to the reference portion 37 of the conductive substrate electrode to switch the spot of ferroelectric. Thus, the ferroelectric polarity can be switched in localized spots depending upon the voltage impressed through means 40, 41, and 42, in conjunction with the use of the light beam addressing system shown in dual beams 44 and 45. As to materials that may be utilized, the materials in each of these layers is fully disclosed and discussed in both Schaffert and Mehta, and in the following example.

The device has a substrate electrode consisting of a film of platinum sputtered onto sapphire. The film of platinum was scribed such that the platinum film was divided into three different parts: The bus bar and two reference portions as shown in FIGS. 3 and 4. A 1 micron thick film of the ferroelectric $PbFe_{1/2}Nb_{1/2}O_3$-$BiFeO_3$-$PbZrO_3$-$LaFeO_3$ solid solution was deposited on the reference portions. The properties of this ferroelectric have been discussed in the Journal of Applied Physics *40*, No. 6, pp. 2,381–2,385, May 1969, by Chapman. Then an interface of discontinuous gold was deposited on the ferroelectric. CdSe photoconductor about 0.7 micron thick was evaporated on the entire surface covering the ferroelectric and bus bar. On the top of the CdSe film a pattern of gold stripe electrodes were formed to cover the entire top surface of the device, which measured about one-half × one-half inch. This was substantially as shown in FIGS. 3 and 4.

Figure 8B:
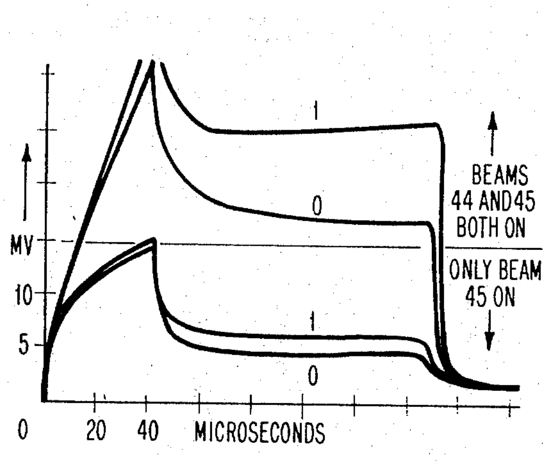
Figure 8C:
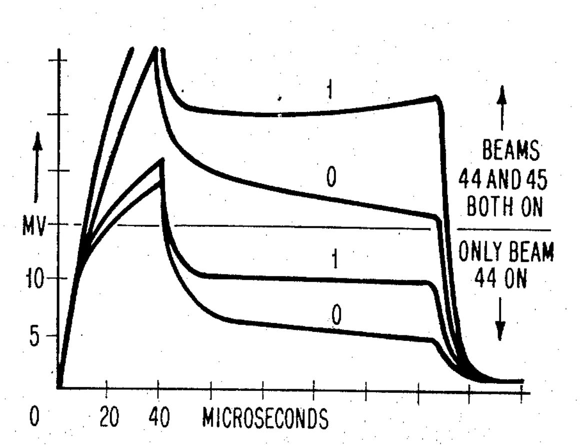

Two light beams were then focused on the device. One was focused on part of the photoconductor over the bus bar and the other beam on part of the photoconductor over the ferroelectric. The drive voltage was applied to the substrate bus bar and the charge switched in the ferroelectric was measured by connecting an integrating capacitor in series with one of the reference substrate electrodes under beam 45. The results are as shown in FIG. 8, *a*, *b*, and *c*, where the traces labeled 1 show the voltage levels for readout of a binary 1 and the traces labeled 0 show the voltage levels for readout of a binary 0.

As shown in all cases (*a*, *b*, *c*), when both light beams are on there is substantial difference between the 1 and 0 levels. When neither light beam or only one light beam is on, there is negligible difference between 1 and 0 in all cases except *c*. In *c*, there is substantially less separation between 1 and 0 with only beam 44 on compared with the results when both beams are on. The separation that does exist in *c* with only beam 44 on is due to partial switching of the ferroelectric in the entire row of bits containing the bit switched when both beams 44 and 45 are on. In practice, if a reasonably random pattern of 1's and 0's were stored in the row, and if differential readout using the two reference portions of the substrate electrode had been used, the separation between 1 and 0 in c with only beam 44 on would also have been completely negligible.

It is of course necessary that the stripe configured electrodes are sufficiently narrow and closely spaced that there is always one or more electrode stripes and one or more gaps-between-stripes crossing any selected address or bit location. The stripe electrodes in this example were 2 microns wide with 4 micron gaps between stripes. The light beams were 50 to 100 microns in diameter. Thus, in essence, one light beam provides the light controlled switching of the bit to be accessed, and the other beam switches the drive voltage onto the stripe electrode or electrodes associated with the bit to be accessed. The light beams do not have to be the same size. Thus the disturbing voltage associated with writing or reading is applied only to the "row" and immediately adjacent rows of bits containing the bit to be accessed. Only those bits in the rows selected by beam 44 are disturbed, and only those same bits generate noise.

As shown in FIGS. 3 and 4, the conductive substrate under the ferroelectric film is divided into two reference portions to allow differential readout for further noise cancellation.

While the above configuration as shown in FIGS. 3 and 4 appreciably reduces noise, the configuration of FIGS. 6 and 7 allows in addition marked improvement in minimizing the photocurrent density necessary in operation of such a device.

FIG. 5 shows the current effect with a device as described in Mehta or in Schaffert. Essentially, a light beam 50 impinging through or about top transparent or striped electrode 51 causes the generation of electrons 52 in photoconductive material 53. The term electrons is here meant to mean current carriers, or the sum of holes plus electrons. Assuming that top conductive electrode 51 is charged negatively, and bottom conductive substrate electrode 54 is charged positively, then ferroelectric material 55 will be so charged as to cause polarity regions to be set up in the direction of arrows 56.

The switching speed of a device as shown in prior art ferroelectric photoconductive storage devices is limited by the photocurrent per unit area (i.e., photocurrent density) which the photoconductor can supply, and is thus limited by the photosensitivity of the photoconductor and the incident light intensity. This again is shown in FIG. 5, with the switching of the ferroelectric proportional to the current density in the area of the photoconductor illuminated by the light beam 50. The switching time is approximately given by $$t=2P_s/i_{PC}$$

where $P_s$ is the ferroelectric spontaneous polarization in coulombs/cm$^2$, $i_{PC}$ is the photocurrent density in amperes/cm$^2$, and $t$ is the switching speed in seconds.

FIGS. 6 and 7 show a means whereby switching speed is shortened without changing photoconductor sensitivity by combining two design changes in the device.

First, the interface layer between the photoconductor and ferroelectric is made to consist of a series of conductor islands having good lateral conductivity. The interface layer is discussed in Mehta, and the island form is shown in FIGS. 6 and 7 as 60. Each of these islands is smaller than the area of the light beam 65, and preferably for example ten or more islands are under the light beam at the same time.

Second, the substrate electrode is made in the form of a striped pattern 61 where the stripe width is narrower than the diameter of the light beam 65 and narrower than the islands 60, constituting the interface layer of the device. At least one electrode stripe is positioned below each conductor island of the interface layer. As seen in FIGS. 6 and 7, these stripes are shown as conductor stripes 61.

Thus, the structure at this point has light beam 65 impinging upon and/or through top electrode 62, causing the generation of electrons 63 in photoconductive material 64. The electrons are attracted to conductive islands 60 in the area illuminated by the light beam. The stripe electrodes 61 are preferably separated by stripes of insulating substrate which will not complete the electrical circuit required for the ferroelectric to switch everywhere under the interface islands. Therefore, only a fraction of the ferroelectric will be switched equal to the fraction of the area under the light beam which is electroded. This is further shown by the concentration in turn of electrons 66 from discontinuous interface island 60 to electrode 61 through ferroelectric 67. Only the localized regions where the "-focused" electrons flow as shown, will be switched in the ferroelectric 67.

Thus, again referring to FIG. 6, photocurrent 63 flows through the photoconductor 64 everywhere under the light beam 65. When the current reaches the interface layer 60, it flows in the plane of the interface islands 60 until it reaches the areas over the substrate electrode stripes 61. Then it charges those areas until the ferroelectric 67 between those areas and the electrode stripes 61 under them switch. Thus, there is a focusing phenomena which in effect causes an area of the ferroelectric to be switched which is less than the area of photoconductor illuminated by the light beam, and therefore a greater current density is available to the ferroelectric than that flowing in the photoconductor. The switching speed of the device is then $$t=f(2P_s/i_{PC})$$

where $f$ is the fraction (<1) of the substrate occupied by the substrate electrode stripes, and the other symbols are as defined earlier.

A practical case has an $f$ value of about one-third to one-fourth.

With this design, current density available to switch the ferroelectric can be further increased by another factor of up to 3 by using a light beam with uniform intensity profile rather than a Gaussian intensity profile. If the uniform profile is used in prior art devices however, it simply results in switching a larger area rather than switching the same area faster.

Again, FIG. 7 shows a top view of that illustrated schematically in FIG. 6, and while the scale is different, all other elements are illustrated and have the same functions as in FIG. 6. Preferably for this focusing embodiment, the conductive substrate electrode is of a plurality of striped configured electrodes, while the top electrode is transparent and is of the bus bar and reference portions configuration, as described previously in conjunction with FIGS. 3 and 4.

Thus, a variety of effects are noted, whereby noise and disturb effects in general may be reduced by utilizing a memory element of the configuration shown in FIGS. 3 and 4, and a focusing effect is achieved by utilizing the device shown in FIGS. 6 and 7. In a preferred embodiment, of course, as shown in FIGS. 6 and 7, the electrode stripes are at right angles to the bus bar as also seen in FIGS. 3 and 4. Other embodiments may be seen, particularly those where the bus bar portion is not at right angles to the plurality of stripe configured electrodes, but at some angle or diagonal crossing configuration, depending on the needs of the designer.

In broader form then, this device may be considered as a memory element to be used in a photoelectric data recording apparatus of the type described in Schaffert and Mehta, comprising a sandwich structure having a top conductive electrode in electrical contact with a photoconductive material in electrical contact with a discontinuous interface layer in electrical contact with a ferroelectric material in electrical contact with a conductive electrode substrate. As described in Mehta, the top conductive electrode and discontinuous interface layer form blocking contacts with the photoconductor in the dark, and are injecting in the light. One of the electrodes comprises a plurality of individual electrodes of stripe configuration, and the other electrode comprises a bus bar portion and at least one reference or ground portion. The bus bar portion is in light controlled electrical contact with at least one localized part of the stripe configured electrodes via the photoconductor material. Essentially, this is the device shown in FIG. 3 and 4.

Of course, a plurality of reference portions may be utilized in conjunction with the bus bar, for differential readout, even though two are shown for simplicity of illustration in the figures. Preferably again, the electrode should be oriented substantially perpendicular to each other. This configuration also allows the greatest ease of manufacture.

The discontinuous interface layer is a thin material controlling the electrical transport phenomena perpendicular to the plane of the device; it is non-electrically conductive in the plane of the device beyond the area of a single bit. This is described in Mehta. A preferable embodiment, however, may have the discontinuous interface layer comprising a plurality of electrically conductive islands as described by Mehta. Thus, lateral electrical conductivity is present, but present only to the extent of the size of a given island, which is less than the size of a single bit.

The electrically conductive islands above, should be less in area than the area of a light beam used to address the memory element. Again, it is still preferable to have the islands of such a size that a plurality of these islands can be located within the area addressed by the light beam, and further oriented such that if the bottom electrode is of a striped configuration, the focusing effect as described above may be implemented. For this of course, the islands are aligned to overlap the electrode stripes.

It is also clear that the method described in the focusing effect is also novel. The two beam method may be described in general as replacing either the top or substrate electrode of the Schaffert or Mehta devices by stripe line electrodes sufficiently narrow and closely spaced that there would always be one or more electrode stripes crossing any selected bit location, and extending the photoconductor beyond the ferroelectric and over (or under) a driving electrode which we have herein called a bus bar.

Two light beams are then used to access the device. One light beam controls the switching of the bit to be accessed, and the other beam switches the drive voltage from the bus bar onto the stripe electrode or electrodes associated with the bit to be accessed. Thus the disturbing voltage associated with writing or reading is applied only to the "row" or rows of bits containing the bit to be accessed. This reduces the background noise during readout very substantially and it very substantially reduces the number of bits which are disturbed during any given access cycle compared to the Shaffert and Mehta devices.

For thick film devices, it is also evident that the top conductive electrode and discontinuous interface electrode do not necessarily have to be blocking contacts in the dark or injecting in the light. For such devices also, where a discontinuous interface layer is desirable but not necessary, the stripe electrode bus bar configuration nevertheless is a marked improvement over prior devices. Clearly also, if the functional layers are sufficiently thick or self supporting, an insulating substrate need not serve that function, as indicated in the examples.

What is claimed is:

1. A memory element for use in photoelectric data recording apparatus comprising a sandwich structure of a top conductive electrode in electrical contact with a photoconductive material in electrical contact with a discontinuous metal interface layer in electrical contact with a ferroelectric material in electrical contact with a conductive electrode substrate, one of said electrodes comprising a plurality of individual electrodes of stripe configuration and the other of said electrodes comprising a bus bar portion and at least one reference portion, with said bus bar portion in light controlled electrical contact with at least one localized part of said stripe configured electrodes via said photoconductor material.

2. A memory element for use in photoelectric data recording apparatus comprising a sandwich structure of a top conductive electrode in electrical contact with a photoconductive material in electrical contact with a ferroelectric material in electrical contact with a conductive electrode substrate, one of said electrodes comprising a plurality of individual electrodes of stripe configuration and the other of said electrodes comprising a bus bar portion and at least one reference portion, with said bus bar portion in light controlled electrical contact with at least one localized part of said stripe configured electrodes via said photoconductor material.

3. A memory element for use in photoelectric data recording apparatus comprising a sandwich structure of a top conductive electrode in electrical contact with a photoconductive material in electrical contact with a discontinuous interface layer in electrical contact with a ferroelectric material in electrical contact with a conductive electrode substrate, said top conductive electrode and discontinuous interface layer being injecting contacts with said photoconductor in the light, one of said electrodes comprising a plurality of individual electrodes of stripe configuration and the other of said electrodes comprising a bus bar portion and at least one reference portion, with said bus bar portion in light controlled electrical contact with at least one localized part of said stripe configured electrodes via said photoconductor material.

4. A memory element for use in photoelectric data recording apparatus comprising a sandwich structure of a top conductive electrode in electrical contact with a photoconductive material in electrical contact with a discontinuous interface layer in electrical contact with a ferroelectric material in electrical contact with a conductive electrode substrate, said top conductive electrode and discontinuous interface layer being blocking contacts with said photoconductor in the dark and injecting in the light, one of said electrodes comprising a plurality of individual electrodes of stripe configuration and the other of said electrodes comprising a bus bar portion and at least one reference portion, with said bus bar portion in light controlled electrical contact with at least one localized part of said stripe configured electrodes via said photoconductor material.

5. The memory element of claim 4 wherein said electrode comprising a bus bar portion and at least one reference portion comprises a bus bar portion and a plurality of reference portions.

6. The memory element of claim 4 wherein said electrodes are oriented substantially orthogonal to each other within the plane of the device.

7. The memory element of claim 4 wherein said discontinuous interface layer comprises a thin layer electrically conductive in the direction perpendicular to the plane of the ferroelectric and photoconductor materials and non-electrically conductive in a direction parallel to the plane of said materials.

8. The memory element of claim 4 wherein said discontinuous interface layer comprises a plurality of electrically conductive islands.

9. The memory element of claim 4 wherein said discontinuous interface layer comprises a plurality of electrically conductive islands, each of said islands being less in area than the area of a light beam used to address said memory element.

10. The memory element of claim 9 wherein each of said islands is less in area than the area of a light beam used to address said memory element, and a plurality of said islands is located within the area addressed by such light beam.

11. The memory element of claim 4 wherein said top electrode is transparent and comprises the bus bar and reference portion configuration and said substrate electrode comprises the stripe configuration.

12. The memory element of claim 11 wherein the discontinuous interface layer comprises a plurality of electrically conductive islands.

13. The memory element of claim 11 wherein said reference portion comprises a plurality of portions having an area of at least that encompassed by a light beam used to address said memory element.

14. The memory element of claim 11 including means for electrically contacting said top conductive electrode and said conductive electrode substrate.

15. The memory element of claim 11 wherein the discontinuous interface layer comprises a plurality of electrically conductive islands, each of said islands being less in area than the area of a light beam used to address said memory element.

16. The memory element of claim 15 where each of said islands is less in area than the area of a light beam used to address said memory element, and a plurality of said islands is located within the area addressed by such light beam.

17. The memory element of claim 16 wherein said conductive electrode substrate comprises a plurality of individual electrodes of stripe configuration and said interface islands are aligned to overlap said electrode stripes, whereby a focusing effect is achieved during addressing.

* * * * *